Patented Nov. 26, 1946

2,411,769

UNITED STATES PATENT OFFICE 2,411,769

GASEOUS MIXTURE

Samuel H. White, Detroit, Mich.

No Drawing. Application July 1, 1946,
Serial No. 680,867

2 Claims. (Cl. 48—197)

The invention is directed to a composition making up a cheap fuel which is readily obtainable for use in cutting metals and for burning, melting, welding, hardening, annealing, and in all other similar applications to metals, and one which is particularly designed for distribution in pipe lines but not necessarily restricted to such distribution.

The gaseous fuel of this invention in a composition providing a gas consisting of the following named ingredients within the range of proportions from a maximum of approximately 5000 cu. ft. at substantially 70° F. and atmospheric pressure, of a gas selected from the class consisting of natural and artificial fuel gases, approximately 25 lbs. of ether and approximately 25 lbs. of benzine, to a minimum of approximately 5000 cu. ft. of the gas above mentioned under the same conditions, and 12½ lbs. of ether and 12½ lbs. of benzine.

According to the invention, when the ingredients are mixed in the proportions stated, a gaseous fuel is produced that raises the calorific value of the gas selected from the class mentioned, and the flame temperature is increased. The composition of the invention is effective in applications to metals in substantially the same manner as acetylene.

The ether and benzine are completely miscible, thereby preventing the freezing of regulators and valves when ether alone is used. The ether and benzine mixture spreads the molecules of the gas, lowers its ignition point, retards flame propagation, and greatly intensifies the flame, thereby imparting a greater flame temperature than is possible with the bare gas. These phenomena enable the gas to perform in a like manner to acetylene for cutting steel and such other purposes, and permits the use of the gas for aluminum welding, lead burning, and like purposes for which heretofore only pure hydrogen was used.

This gaseous fuel for the purposes mentioned here may be distributed through a pipe line under desired or necessary pressure, depending primarily upon the work to be done.

Although the minimum proportions mentioned here are effective for the purposes stated, the maximum proportions are desirable for all uses on thick or rusty metals, for blowing holes or bevel cutting and the like, and for ordinary use the proportions below the maximum and above the minimum may be used effectively.

What I claim as new is:

1. A composition providing a gas consisting of the following named ingredients within the range of proportions from a maximum of approximately 5000 cu. ft. at substantially 70° F. and atmospheric pressure, of a gas selected from the class consisting of natural and artificial fuel gases, approximately 25 lbs. of ether, and approximately 25 lbs. of benzine, to a minimum of approximately 5000 cu ft. of said gas under similar conditions, together with 12.5 lbs. of ether and 12.5 lbs. of benzine.

2. A composition providing a gas consisting of the following named ingredients within the range of approximately 5000 cu. ft. of a gas selected from the class including natural and artificial gas, at substantially 70° F. and at atmospheric pressure, and 25 lbs. of ether, and 25 lbs. of benzine.

SAMUEL H. WHITE.